(12) United States Patent
Zamyatin et al.

(10) Patent No.: US 8,837,797 B2
(45) Date of Patent: Sep. 16, 2014

(54) SPATIAL RESOLUTION IMPROVEMENT IN COMPUTER TOMOGRAPHY (CT) USING ITERATIVE RECONSTRUCTION

(75) Inventors: Alexander Zamyatin, Hawthorn Woods, IL (US); Michael D. Silver, Northbrook, IL (US); Daxin Shi, Vernon Hills, IL (US)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 439 days.

(21) Appl. No.: 13/347,398

(22) Filed: Jan. 10, 2012

(65) Prior Publication Data

US 2013/0177225 A1    Jul. 11, 2013

(51) Int. Cl.
*G06K 9/00* (2006.01)
(52) U.S. Cl.
USPC ......................................................... 382/131
(58) Field of Classification Search
None
See application file for complete search history.

(56) References Cited

U.S. PATENT DOCUMENTS

| 8,615,118 | B2* | 12/2013 | Yi et al. | 382/128 |
|---|---|---|---|---|
| 2011/0097007 | A1 | 4/2011 | Zeng et al. | |
| 2013/0028495 | A1* | 1/2013 | Star-Lack et al. | 382/131 |
| 2013/0093805 | A1* | 4/2013 | Iversen | 345/690 |

OTHER PUBLICATIONS

Zeng, Kai, De Man, Bruno, Thibault, Jean-Baptiste, Yu, Zhou, Bouman, Charles and Sauer, Ken, "Spatial Resolution Enhancement in CT Iterative Reconstruction", Proceedings of IEEE Nuclear Science Symposium, M13-201, pp. 3748-3751, 2009.

* cited by examiner

*Primary Examiner* — Shafali Goradia
(74) *Attorney, Agent, or Firm* — Yoshida & Associates, LLC

(57) ABSTRACT

Spatial resolution is substantially improved by simulating a system blur kernel including an angle variable in the forward projection during a predetermined iterative reconstruction technique. The iterative reconstruction acts as a deconvolution, which overcomes certain restrictions of system optics. In general, resolution is substantially improved with cone beam and helical data without a large increase in noise.

16 Claims, 7 Drawing Sheets

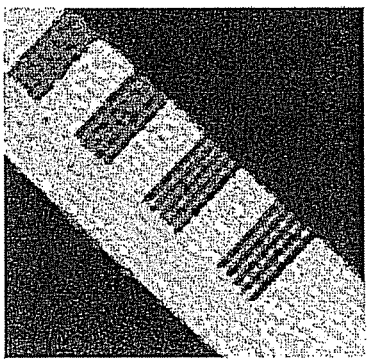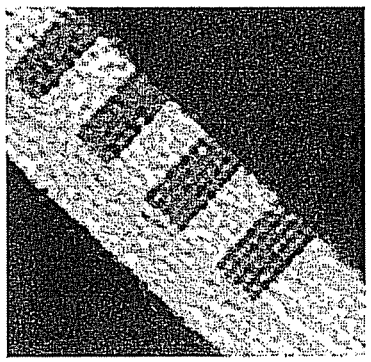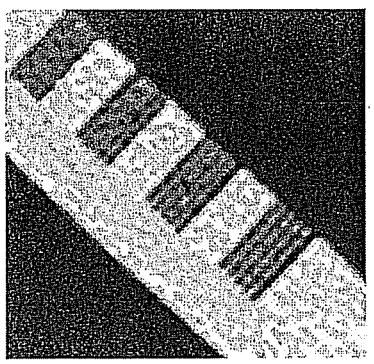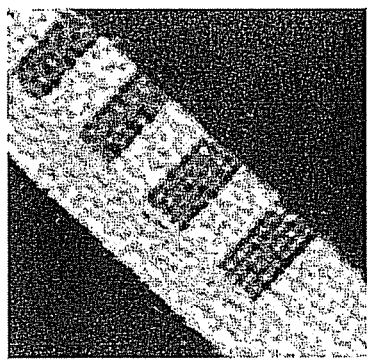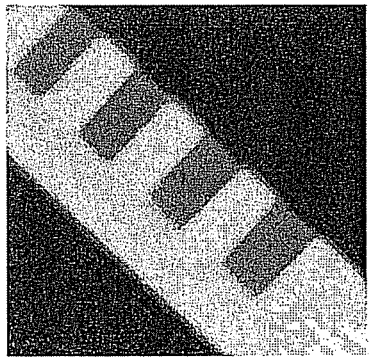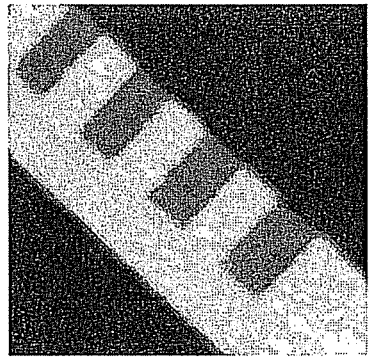
FIG. 6A  FIG. 6B  FIG. 6C
FBP-ST  FBP-HR  IR
300 mAs
90 mAs FBP-Lung

L/W=-600/1000

IR

L/W=-600/1000

SPATIAL RESOLUTION IMPROVEMENT IN COMPUTER TOMOGRAPHY (CT) USING ITERATIVE RECONSTRUCTION

FIELD OF THE INVENTION

The current invention is generally related to an image processing and system, and more particularly related to the application of a certain low pass filter to iterative reconstruction techniques such as Algebraic Reconstruction Technique (ART), Simultaneous Algebraic Reconstruction Technique (SART) and Ordered-subset Simultaneous Algebraic Reconstruction Technique (OS-SART).

BACKGROUND OF THE INVENTION

For volume image reconstruction, an iterative algorithm has been developed by various groups and includes a total variation (TV) minimization iterative reconstruction algorithm. Iterative reconstruction (IR) additionally involves Algebraic Reconstruction Technique (ART), Simultaneous Algebraic Reconstruction Technique (SART) or Ordered-subset Simultaneous Algebraic Reconstruction Technique (OS-SART).

In X-ray computed tomography (CT), iterative reconstruction (IR) has gained some attention to improve certain aspects of image quality over conventional filtered backprojection (FBP). IR is based on a forward model that accurately estimates the attenuation line integrals, while keeping computational complexity manageable. On the other hand, FBP is based upon reconstruction kernels.

Prior art has attempted to improve spatial resolution in both IR and FBP techniques. In conventional FBP techniques, one way to improve spatial resolution is to apply sharp convolution kernels with high-frequency boost (FBP-HR) to undo spatial blurring factors in the imaging system, such as finite focal spot size, finite detector cell size, detector cross talk and azimuthal blur. Although IR does not have the notion of reconstruction kernels, IR still can improve the image resolution and image noise.

Prior art IR techniques enhanced the spatial resolution with certain noise compensation means. One prior art IR technique has utilized an enlarged voxel footprint in the forward model, combined with a band suppression filter designed to eliminate any undesirable over- or under-shoot artifacts that may arise from the use of the enlarged voxels. Another prior art approach has used libraries of point-spread functions to model the spatially varying voxel footprint.

Despite the above prior art efforts, a trade off still exists between the noise suppressions and the spatial resolution improvement among the iterative reconstruction techniques.

BRIEF DESCRIPTION OF THE DRAWINGS

FIG. 6A illustrates the spatial resolution of predetermined stripes at certain exposures using a standard kernel (FBP-ST).

FIG. 6B illustrates the spatial resolution of the same predetermined stripes at certain exposures using a sharp convolution kernel with high-frequency boost (FBP-HR).

FIG. 6C illustrates the spatial resolution of the same predetermined stripes at certain exposures using one exemplary angle-dependent spatially variant low pass filter in the iterative reconstruction (IR) technique according to the current invention.

DETAILED DESCRIPTION OF THE PREFERRED EMBODIMENT(S)

Figure 1:
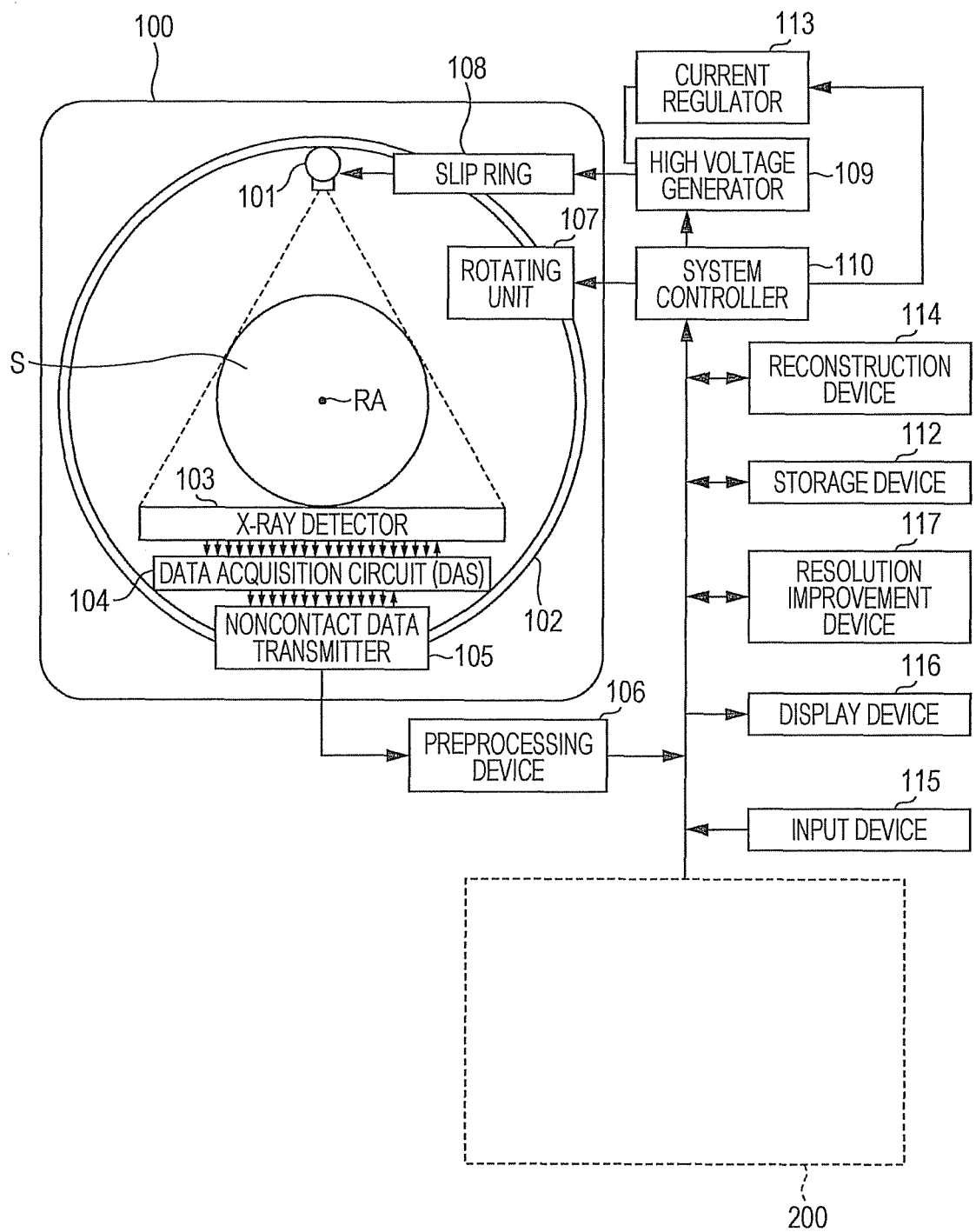
FIG. 1 is a diagram illustrating one embodiment of the multi-slice X-ray CT apparatus or scanner according to the current invention.

Referring now to the drawings, wherein like reference numerals designate corresponding structures throughout the views, and referring in particular to FIG. 1, a diagram illustrates one embodiment of the multi-slice X-ray CT apparatus or scanner according to the current invention including a gantry 100 and other devices or units. The gantry 100 is illustrated from a side view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which is rotatably supported around a rotation axis RA. A rotating unit 107 rotates the frame 102 at a high speed such as 0.4 sec/rotation while the subject S is being moved along the axis RA into or out of the illustrated page.

The multi-slice X-ray CT apparatus further includes a high voltage generator 109 that applies a tube voltage to the X-ray tube 101 through a slip ring 108 so that the X-ray tube 101 generates X ray. The X rays are emitted towards the subject S, whose cross sectional area is represented by a circle. The X-ray detector 103 is located at an opposite side from the X-ray tube 101 across the subject S for detecting the emitted X rays that have transmitted through the subject S.

Still referring to FIG. 1, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, display device 116, input device 115, and the scan plan support apparatus 200. The scan plan support apparatus 200 includes a function for supporting an imaging technician to develop a scan plan.

One embodiment of the reconstruction device 114 further includes various software and hardware components. According to one aspect of the current invention, the reconstruction device 114 of the CT apparatus advantageously improves spatial resolution using an iterative reconstruction technique. In one embodiment, the reconstruction device 114 in one embodiment of the current invention operates the total variation iterative reconstruction (TVIR) algorithm, which performs on the projection data an ordered subset simultaneous algebraic reconstruction technique (OS-SART) step and a TV minimization step. The two steps are sequentially implemented in the main loop where a number of iterations were prescribed.

Before the TV minimization step, the projection data undergoes an ordered subsets simultaneous algebraic reconstruction technique (OS-SART) in one embodiment of the reconstruction device 114. The projection data is grouped into a predetermined number of subsets N each having a certain number of views. During the ordered subsets simultaneous algebraic reconstruction technique (OS-SART), each subset may be sequentially processed in one embodiment. In another embodiment, a plurality of the subsets may be processed in parallel by taking advantage of certain microprocessor such as multiple central processing units (CPU) or a graphics processing unit (GPU).

During the ordered subsets simultaneous algebraic reconstruction technique (OS-SART), the reconstruction device 114 also performs two major operations. Namely, for each subset N, one embodiment of the reconstruction device 114 re-projects the image volume to form the computed projection data and back-projects the normalized difference between the measured projection and the computed projection data to reconstruct an updated image volume. In further detail, one embodiment of the reconstruction device 114 re-projects the image volume by using the ray tracing technique where no coefficient of the system matrix is cached. Moreover, one embodiment of the reconstruction device 114 simultaneously re-projects all rays in a subset, and this is optionally implemented in parallel. In the back-projection, one embodiment of the reconstruction device 114 uses a pixel-driven technique to back-project all of the normalized difference projection data in a subset to form the desired updated image volume. Because the reconstruction device 114 back-projects all ray sums, i.e., difference projection data, in a subset to form an image volume, this operation is optionally implemented in parallel too. These operations are applied to every subset N to complete a single OS-SART step. This and other embodiments are optionally included in the current scope of the invention as more particularly claimed in the appended claims.

In the total variation (TV) minimization step, one embodiment of the reconstruction device 114 optionally employs a line search strategy to search a positive step size so as to ensure the objective function of the current image volume to be smaller than that of the previous image volume. The total variation (TV) minimization step is optional in practicing the current invention.

One embodiment of the current invention further includes various software modules and hardware components for substantially improving spatial resolution in computer tomography images using a predetermined filter while the images are being iteratively reconstructed. According to one aspect of the current invention, a resolution improvement device 117 of the CT apparatus advantageously improves the spatial resolution. In one embodiment, the resolution improvement device 117 is operationally connected to other software modules and or system components such as the storage device 112, the reconstruction device 114, the display device 116 and the input device 115 via a data/control bus. In this regard, the resolution improvement device 117 alone does not necessarily perform resolution functions and or their associated tasks in other embodiments according to the current invention. As will be described in more detail, the resolution improvement device 117 substantially improves the spatial resolution using a spatially variant low pass filter that is also angular sensitive.

Figure 2:
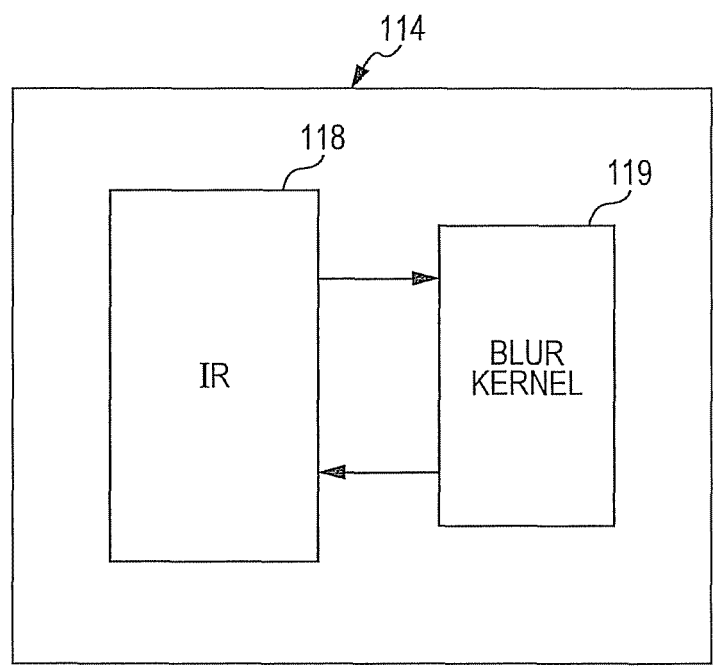
FIG. 2 is a diagram illustrating the resolution improvement device in an alternative embodiment according to the current invention.

Referring to FIG. 2, the resolution improvement device 117 is optionally a part of other devices such as the reconstruction device 114 in alternative embodiments according to the current invention. The reconstruction device 114 further includes an iterative reconstruction unit 118 and a blur kernel 119 in lieu of having a separate resolution improvement device 117. In essence, the blur kernel 119 substantially improves the spatial resolution as the iterative reconstruction unit 118 iteratively reconstructs the images. As will be described in more detail, the blur kernel 119 substantially improves the spatial resolution using a spatially variant low pass filter that is also angular sensitive.

Figure 3:
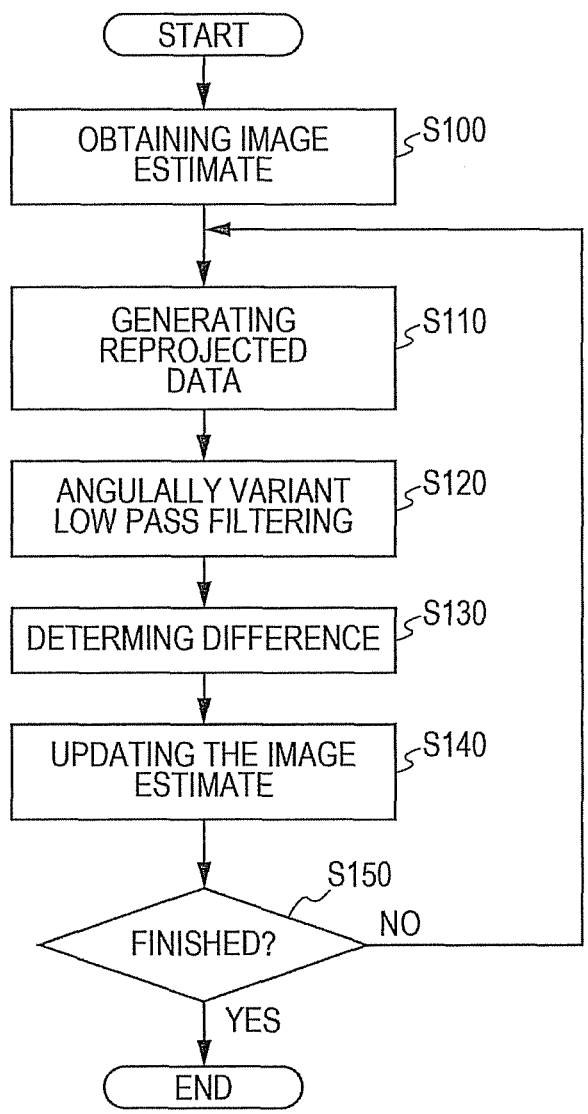
FIG. 3 is a flow chart illustrating steps involved in one process of substantially improving spatial resolution in iteratively reconstructing images according to the current invention.

Now referring to FIG. 3, a flow chart illustrates steps involved in one process of substantially improving spatial resolution in iteratively reconstructing images according to the current invention. In general, the exemplary process substantially improves spatial resolution as the images are iteratively reconstructed by applying a spatially variant low pass filter that is also angular sensitive. In a step S100, an image estimate is obtained using a predetermined CT scanner system. In a step S110, the image estimate is forward projected using at least a single ray to generate reprojected data. According to one exemplary forward projection in the step S110, a combination of the system optics is optionally taken into account. For example, the system optics includes a focal spot size, a detector size and an image voxel size. The image voxel size is not enlarged in one exemplary process of substantially improving spatial resolution in iteratively reconstructing images according to the current invention. In a step S 120, at least a predetermined angularly variant low pass filter is applied to the reprojected data to generate processed data. In a step S130, a difference is determined between the processed data of the step S120 and the measured data as used in the step S100. Consequently, the image estimate is updated based upon the difference as determined in the step S130 to generate an updated image in a step S140. The exemplary IR process according to the current invention iterates the steps S110 through S140 using the updated image as the image estimate in the step S110 for a predetermined number of times or until a predetermined condition is satisfied in a step S150. That is, the step S150 determines as to whether or not the exemplary IR process continues the iteration or finishes according to the current invention.

Still referring to FIG. 3, the system optics blur is overestimated in order to sharpen the images in certain situations. IR acts as a deconvolution and substantially overcomes the limitations of the system optics such as a focal spot size and a detector element size. That is, a system blur kernel is simulated in the forward projection in order to improve spatial resolution. According to one exemplary IR process, images are substantially improved in spatial resolution by applying to the reprojected data at least an angularly variant low pass filter to generate processed data in a step S 120. The angularly variant low pass filter in the step S120 is an example of the system blur kernel and optionally includes other additional variable components such as distance in combination with angle to affect the low pass filter characteristics. The details of the angularly variant low pass filter in the step S120 will be further provided with respect to other drawings. Consequently, the above exemplary IR process of substantially improving spatial resolution according to the current invention improves diagnostic values in clinical CT applications such as imaging of the lungs and coronary computed tomography angiogram (CTA) where a high degree of spatial resolution is required.

Figure 4:
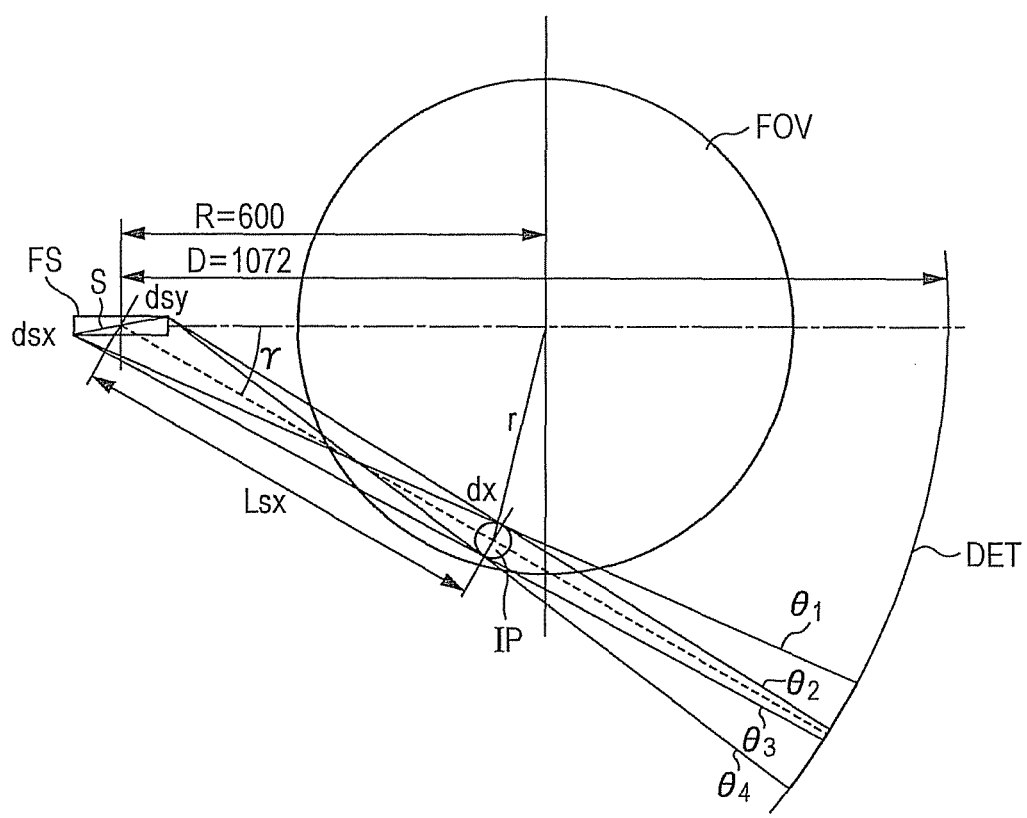
FIG. 4 is a diagram illustrating certain characteristics of one exemplary focal spot in relation to an image pixel and a detector according to the current invention.

Now referring to FIG. 4, a diagram illustrates certain characteristics of one exemplary focal spot in relation to an image pixel and a detector according to the current invention. A focal spot FS and a detector array DET are placed at a certain position with respect to an image pixel IP in a field of view FOV. The focal spot FS is projected as a relatively thin strip or width dsx on the detector DET as indicated by a dotted line at one angle. On the other hand, the focal spot FS is projected as a relatively elongated strip dsy on the detector DET as indicated by solid lines going through the image pixel IP at another angle.

Figure 5:
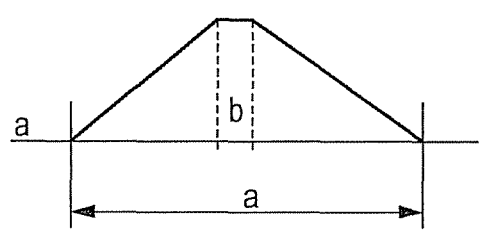
FIG. 5 is a diagram illustrating certain characteristics of one example of the angle-dependent spatially variant low pass filter according to the current invention.

Now referring to FIG. 5, a diagram illustrates certain characteristics of one example of the angle-dependent spatially variant low pass filter according to the current invention. The characteristics of the angle-dependent spatially variant low pass filter are described with respect to the exemplary focal spot in relation to an image pixel and a detector as depicted in FIG. 4. The characteristics of the angle-dependent spatially variant low pass filter is characterized by a base a and a plateau b, which define the blur kernel size. The base a is a range of the filter as indicated by a double-headed arrow while the plateau b is a partial domain at the max value of the filter as indicated by a pair of dotted lines.

$$a = (D-S/2)\theta_4 - (D+S/2)\theta_1 \quad (1)$$

$$b = (D-S/2)\theta_3 - (D+S/2)\theta_2; \text{ (if } b<0\text{, set } b=0) \quad (2)$$

where D is a distance between the focal spot FS and the detector DET while S is an effective source size at a specific angle γ as shown in FIG. 4. γ is the channel angle. S=dsx cos γ+dsy| sin γ| For example, dsx is 1 mm while dsy is 7 mm. The center is approximated by (∠sx=R cos γ) , ∠sx is distance from the focal spot. A pixel is determined by (∠sx, γ).

$$\theta_1 \approx a \sin((r-dx/2)/(R+S/2)) \quad (4)$$

$$\theta_2 \approx a \sin((r-dx/2)/(R-S/2)) \quad (5)$$

$$\theta_3 \approx a \sin((r+dx/2)/(R+S/2)) \quad (6)$$

$$\theta_4 \approx a \sin((r+dx/2)/(R-S/2)) \quad (7)$$

r=R| sin γ| dx=FOV/Nx r is a distance from the isocenter (field of view FOV center) to the image pixel IP center while dx is an image pixel IP size as shown in FIG. 4. R is a distance from the field of view FOV center to the focal spot FS center as also shown in FIG. 4. As seen in the above equations (1) through (7), the effects of one exemplary angle-dependent spatially variant low pass filter are dependent on spatial variables including the angles according to the current invention. In contrast to the above approximations, the angularly variant blur kernel is computed based upon true focal spot geometry such as elongation and tilt in another embodiment of the current invention.

Now referring to FIGS. 6A through 6C, the effects of one exemplary angle-dependent spatially variant low pass filter in the iterative reconstruction technique according to the current invention are compared to other reconstruction techniques. In conventional filtered-back-projection (FBP) techniques, spatial resolution is improved by employing a sharp convolution kernel with high-frequency boost (FBP-HR) instead of using a standard kernel (FBP-ST). FIG. 6A illustrates the spatial resolution of predetermined stripes at certain exposures (300 milliampere per second (mAs) and 90 mAs) using a standard kernel (FBP-ST). FIG. 6B illustrates the spatial resolution of the same predetermined stripes at certain exposures (300 mAs and 90 mAs) using a sharp convolution kernel with high-frequency boost (FBP-HR). Lastly, FIG. 6C illustrates the spatial resolution of the same predetermined stripes at certain exposures (300 mAs and 90 mAs) using one exemplary angle-dependent spatially variant low pass filter in the iterative reconstruction (IR) technique according to the current invention. Although the resolution has substantially improved between FIGS. 6A and 6B, it appears that a noise level has also increased. On the other hand, the spatial resolution of the same predetermined stripes has substantially improved at both exposures using one exemplary angle-dependent spatially variant low pass filter in the iterative reconstruction technique according to the current invention as illustrated in FIG. 6C. In particular, a noise level appears substantially lower in 300 mAs while the spatial resolution has substantially improved by the exemplary angle-dependent spatially variant low pass filter in the iterative reconstruction technique according to the current invention.

Figure 7A:
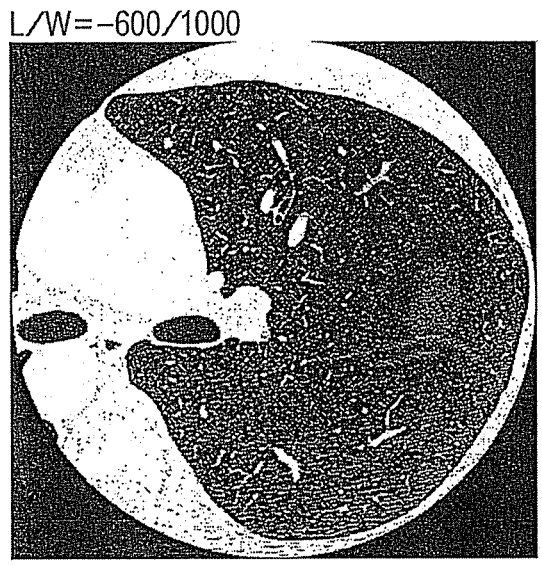
FIG. 7A illustrates the spatial resolution of a lung image using a filtered-back-projection (FBP) technique.
Figure 7B:
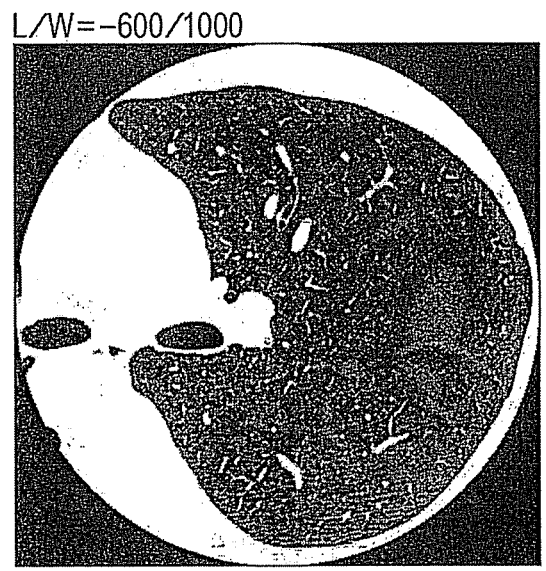
FIG. 7B illustrates the spatial resolution of the same lung image using one exemplary angle-dependent spatially variant low pass filter in the iterative reconstruction (IR) technique according to the current invention.

Now referring to FIGS. 7A and 7B, the effects of one exemplary angle-dependent spatially variant low pass filter in the iterative reconstruction technique according to the current invention are illustrated using clinical data. FIG. 7A illustrates the spatial resolution of a lung image using a filtered-back-projection (FBP) technique. FIG. 7B illustrates the spatial resolution of the same lung image using one exemplary angle-dependent spatially variant low pass filter in the iterative reconstruction (IR) technique according to the current invention. In certain regions of the lung image as indicated by the circles, a noise level appears substantially lower while the spatial resolution has substantially improved by the exemplary angle-dependent spatially variant low pass filter in the iterative reconstruction technique according to the current invention.

Figure 8A:
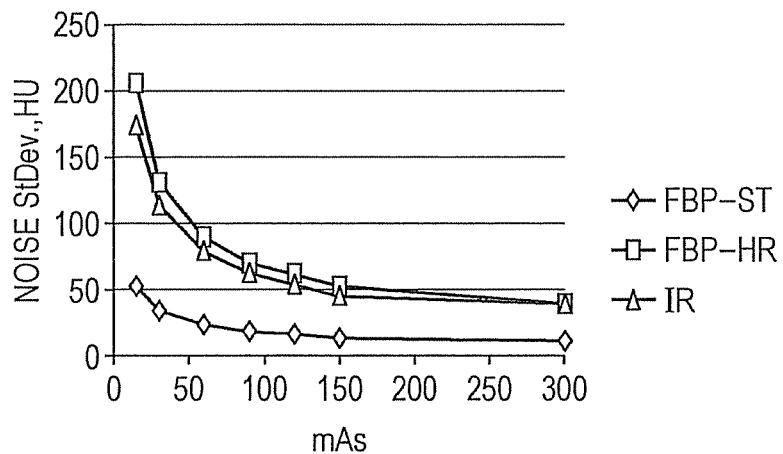
FIG. 8A is a graph illustrating a noise level over a predetermined exposure range as the spatial resolution is improved among a standard kernel (FBP-ST), a sharp convolution kernel with high-frequency boost (FBP-HR) and one exemplary angle-dependent spatially variant low pass filter in the iterative reconstruction (IR) technique according to the current invention.
Figure 8B:
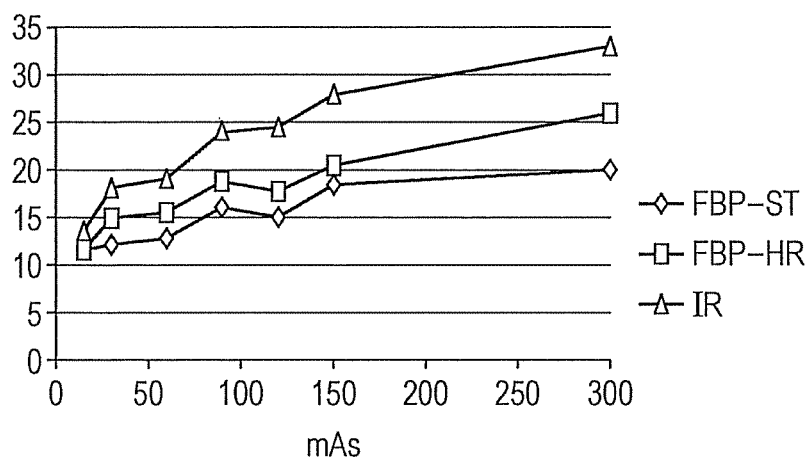
FIG. 8B is a graph illustrating modulation to noise ratios over a predetermined exposure range as the spatial resolution is improved among a standard kernel (FBP-ST), a sharp convolution kernel with high-frequency boost (FBP-HR) and one exemplary angle-dependent spatially variant low pass filter in the iterative reconstruction (IR) technique according to the current invention.

Now referring to FIGS. 8A and 8B, the effects of one exemplary angle-dependent spatially variant low pass filter in the iterative reconstruction technique according to the current invention are compared to other reconstruction techniques. In conventional filtered-back-projection (FBP) techniques, spatial resolution is improved by employing a sharp convolution kernel with high-frequency boost (FBP-HR) instead of using a standard kernel (FBP-ST). FIG. 8A illustrates a noise level over a predetermined exposure range as the spatial resolution is improved among a standard kernel (FBP-ST), a sharp convolution kernel with high-frequency boost (FBP-HR) and one exemplary angle-dependent spatially variant low pass filter in the iterative reconstruction (IR) technique according to the current invention. Although the FBP-ST has the lowest noise level across the exposure range, the spatial resolution is also lower in comparison to other techniques. Although the FBP-HR and IR techniques both have a substantially improve level of spatial resolution in the reconstructed image, both the FBP-HR and IR techniques also have a higher level of noise across the exposure range. The comparison of the FBP-HR and IR techniques reveals that the IR technique according to the current invention yields a lower noise level than the FBP-HR technique across the entire exposure range.

FIG. 8B illustrates modulation to noise ratios over a predetermined exposure range as the spatial resolution is improved among a standard kernel (FBP-ST), a sharp convolution kernel with high-frequency boost (FBP-HR) and one exemplary angle-dependent spatially variant low pass filter in the iterative reconstruction (IR) technique according to the current invention. Although the FBP-ST has the lowest modulation to noise ratio across the exposure range, the spatial resolution is also lower in comparison to other techniques. The FBP-HR and IR techniques both have a substantially improve level of spatial resolution in the reconstructed image, and both the FBP-HR and IR techniques also have a higher modulation value to noise ratio across the exposure range. The comparison of the FBP-HR and IR techniques reveals that the IR technique according to the current invention yields a substantially higher modulation to noise ratio than the FBP-HR technique across the entire exposure range.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of improving spatial resolution in iteratively reconstructed image volume, comprising the steps of:
    a) obtaining an image estimate from the measured data;
    b) forward projecting the image estimate using at least a single ray to generate reprojected data;
    c) applying to the reprojected data at least an angularly variant low pass filter to generate processed data;
    d) determining a difference between the processed data and the measured data;
    e) updating the image estimate based upon the difference to generate an updated image; and
    f) iterate the steps b) through e) using the updated image as the image estimate in the step b).

2. The method of improving spatial resolution in iteratively reconstructed image volume according to claim 1 further comprising additional steps of regularizing the update image after the step e).

3. The method of improving spatial resolution in iteratively reconstructed image volume according to claim 1 wherein the low pass filter has an angularly variant blur kernel based upon a combination of a focal spot size, a detector size and an image unit size.

4. The method of improving spatial resolution in iteratively reconstructed image volume according to claim 3 further comprising a step of controlling the blur kernel to obtain a clinically desired spatial resolution.

5. The method of improving spatial resolution in iteratively reconstructed image volume according to claim 4 wherein the image estimate in the step a) is obtained by filtered back projection and the blur kernel is controlled to match a resolution level of the image estimate in the step a).

6. The method of improving spatial resolution in iteratively reconstructed image volume according to claim 3 wherein the angularly variant blur kernel is computed based upon focal spot geometry with a realistic elongated footprint.

7. The method of improving spatial resolution in iteratively reconstructed image volume according to claim 6 wherein a size of the angularly variant blur kernel is determined by base a and plateau b, $$a=(D-S/2)\theta_4-(D+S/2)\theta_1$$

$$b=(D-S/2)\theta_3-(D+S/2)\theta_2; \text{ (if b<0, set b=0)}$$

where D is a distance between a focal spot and a detector while S is an effective source size at a predetermined angle, $$\theta_1 \approx a\sin((r-dx/2)/(R+S/2))$$

$$\theta_2 \approx a\sin((r-dx/2)/(R-S/2))$$

$$\theta_3 \approx a\sin((r+dx/2)/(R+S/2))$$

$$\theta_4 \approx a\sin((r+dx/2)/(R-S/2))$$

where r is a distance from an isocenter to a predetermined image pixel center while dx is an image pixel size and R is a distance from the isocenter to the focal spot.

8. The method of improving spatial resolution in iteratively reconstructed image volume according to claim 3 wherein the angularly variant blur kernel is computed based upon true focal spot geometry.

9. A system for improving spatial resolution in iteratively reconstructed image volume, comprising:
    an iterative construction device for obtaining an image estimate from the measured data and forward projecting the image estimate using at least a single ray to generate reprojected data; and
    a resolution improvement device connected to said iterative construction device for applying to the reprojected data at least an angularly variant low pass filter to generate processed data, wherein said iterative construction device determines a difference between the processed data and the measured data, said iterative construction device updating the image estimate based upon the difference to generate an updated image, said iterative construction device iteratively generating images based upon the updated image.

10. The system for improving spatial resolution in iteratively reconstructed image volume according to claim 9 wherein said iterative construction device comprises a regularizing unit for regularizing the update image.

11. The system for improving spatial resolution in iteratively reconstructed image volume according to claim 9 wherein the low pass filter has an angularly variant blur kernel based upon a combination of a focal spot size, a detector size and an image unit size.

12. The system for improving spatial resolution in iteratively reconstructed image volume according to claim 11 wherein said iterative construction device controls the blur kernel to obtain a clinically desired spatial resolution.

13. The system for improving spatial resolution in iteratively reconstructed image volume according to claim 12 wherein said iterative construction device obtains the image estimate by filtered back projection and controls the blur kernel to match a resolution level of the image estimate.

14. The system for improving spatial resolution in iteratively reconstructed image volume according to claim 11 wherein the angularly variant blur kernel is computed based upon focal spot geometry with a realistic elongated footprint.

15. The system for improving spatial resolution in iteratively reconstructed image volume according to claim 14 wherein a size of the angularly variant blur kernel is determined by base a and plateau b, $a=(D-S/2)\theta_4-(D+S/2)\theta_1$ $b=(D-S/2)\theta_3-(D+S/2)\theta_2$; (if b<0, set b=0)

where D is a distance between a focal spot and a detector while S is an effective source size at a predetermined angle, $\theta_1 \approx a\sin((r-dx/2)/(R+S/2))$ $\theta_2 \approx a\sin((r-dx/2)/(R-S/2))$ $\theta_3 \approx a\sin((r+dx/2)/(R+S/2))$ $\theta_4 \approx a\sin((r+dx/2)/(R-S/2))$ where r is a distance from an isocenter to a predetermined image pixel center while dx is an image pixel size and R is a distance from the isocenter to the focal spot.

16. The system for improving spatial resolution in iteratively reconstructed image volume according to claim 11 wherein the angularly variant blur kernel is computed based upon true focal spot geometry.

* * * * *